United States Patent
Lee et al.

(10) Patent No.: US 9,184,949 B2
(45) Date of Patent: *Nov. 10, 2015

(54) PILOT DESIGN FOR UNIVERSAL FREQUENCY REUSE IN CELLULAR ORTHOGONAL FREQUENCY-DIVISION MULTIPLEXING SYSTEMS

(71) Applicant: Marvell World Trade Ltd., St. Michael (BB)

(72) Inventors: Jungwon Lee, San Diego, CA (US); Hui-Ling Lou, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,486

(22) Filed: Feb. 6, 2014

(65) Prior Publication Data

US 2014/0153659 A1 Jun. 5, 2014

Related U.S. Application Data

(63) Continuation of application No. 12/189,437, filed on Aug. 11, 2008, now Pat. No. 8,665,694.

(60) Provisional application No. 60/955,948, filed on Aug. 15, 2007.

(51) Int. Cl.
*H04L 25/03* (2006.01)
*H04L 5/00* (2006.01)
(Continued)

(52) U.S. Cl.
CPC .......... *H04L 25/03821* (2013.01); *H04L 5/005* (2013.01); *H04L 5/0007* (2013.01); *H04L 5/0039* (2013.01); *H04L 5/0051* (2013.01);
(Continued)

(58) Field of Classification Search
None
See application file for complete search history.

(56) References Cited

U.S. PATENT DOCUMENTS 5,867,478 A 2/1999 Baum et al.
6,154,654 A 11/2000 Mao
(Continued)

FOREIGN PATENT DOCUMENTS

EP 1 178 641 6/2002
WO WO 98/59450 12/1998
WO WO 2008/082243 7/2008

OTHER PUBLICATIONS

Ericsson, "Uplink reference signals," 3GPP Draft; R1-071030, 3rd Generation Partnership Project (3GPP), Mobile Competence Centre (Feb. 6, 2007).

(Continued)

*Primary Examiner* — Gary Mui

(57) ABSTRACT

Systems and methods are provided for transmitting information between an intended source and a receiver to minimize co-channel interference from at least one interfering source. Pilot subcarriers and data subcarriers may be broadcast from an intended source and at least one interfering source. The pilot subcarriers may be shared across base stations or distributed among base stations in frequency, in time, or both. In addition, the frequency reuse factor of the pilot subcarriers may be different than the frequency reuse factor of the data subcarriers A receiver receives a composite signal that corresponds with an intended signal from an intended source and an interfering signal from at least one interfering source. The portion of the received signal that corresponds to the intended signal may be recovered by the receiver based on the broadcast of the pilot subcarriers.

20 Claims, 12 Drawing Sheets

(51) Int. Cl.
  *H04L 25/02* (2006.01)
  *H04W 16/02* (2009.01)
  *H04L 27/26* (2006.01)

(52) U.S. Cl.
  CPC ............ *H04L 5/0062* (2013.01); *H04L 5/0082* (2013.01); *H04L 5/0083* (2013.01); *H04L 25/0204* (2013.01); *H04W 16/02* (2013.01); *H04L 5/0021* (2013.01); *H04L 25/0226* (2013.01); *H04L 27/2613* (2013.01)

(56) References Cited

U.S. PATENT DOCUMENTS

| | | |
|---|---|---|
| 6,917,580 B2 | 7/2005 | Wang et al. |
| 7,280,467 B2 | 10/2007 | Smee et al. |
| 7,327,812 B2 | 2/2008 | Auer |
| 7,492,828 B2 | 2/2009 | Keerthi |
| 7,558,237 B2 | 7/2009 | Mottier et al. |
| 7,764,593 B2 | 7/2010 | Kim et al. |
| 7,778,337 B2 | 8/2010 | Tong et al. |
| 7,808,884 B2 | 10/2010 | Jitsukawa |
| 7,873,117 B2 | 1/2011 | Fukuoka et al. |
| 7,983,236 B2 | 7/2011 | Rinne |
| 7,990,928 B2 | 8/2011 | Kwon |
| 8,018,975 B2 | 9/2011 | Ma et al. |
| 8,032,145 B2 | 10/2011 | Ji |
| 8,073,063 B2 | 12/2011 | Ma et al. |
| 8,121,105 B2 | 2/2012 | Inoue |
| 2003/0119451 A1 | 6/2003 | Jang et al. |
| 2004/0131007 A1 | 7/2004 | Smee et al. |
| 2005/0220002 A1* | 10/2005 | Li et al. .................. 370/208 |
| 2006/0045001 A1* | 3/2006 | Jalali ...................... 370/208 |
| 2006/0268676 A1 | 11/2006 | Gore et al. |
| 2007/0098050 A1 | 5/2007 | Khandekar et al. |
| 2007/0140168 A1* | 6/2007 | Laroia et al. ............ 370/330 |
| 2008/0108365 A1 | 5/2008 | Buddhikot et al. |
| 2008/0165891 A1 | 7/2008 | Budianu et al. |
| 2009/0034659 A1* | 2/2009 | Beaulieu et al. ............ 375/340 |
| 2010/0085866 A1 | 4/2010 | Li et al. |

OTHER PUBLICATIONS

Motorola, "Downlink reference signal sequence design," 3GPP Draft; R1- 62071_DOWNLINKPILOTDESIGN, 3rd Generation Partnership Proejct (3GPP) Mobile Competence Centre (Sep. 23, 2006).

* cited by examiner

PILOT DESIGN FOR UNIVERSAL FREQUENCY REUSE IN CELLULAR ORTHOGONAL FREQUENCY-DIVISION MULTIPLEXING SYSTEMS

CROSS-REFERENCE TO RELATED APPLICATIONS

This application is a continuation of U.S. patent application Ser. No. 12/189,437, filed Aug. 11, 2008 (currently pending), which claims the benefit under 35 U.S.C. §119(e) of U.S. Provisional Application No. 60/955,948 filed Aug. 15, 2007, all of which are hereby incorporated herein by reference in their entireties.

BACKGROUND

The following relates generally to transmitting information between an intended source and a receiver in a communication system, and more particularly to designs for frequency reuse and pilot subcarriers to minimize co-channel interference during transmission from other sources that cause interference.

There are several conventional techniques to increase the throughput of a wireless network. These techniques aim to expand the amount of information that can be transmitted over the network while minimizing the probability that errors will occur during transmission. One of these techniques is frequency reuse, which entails using the same frequency on a network for multiple simultaneous transmissions. Most wireless communication systems are designed to achieve a frequency reuse of one, which is often referred to as the "universal" frequency reuse factor. A frequency reuse of one means that the source, or base station, for each cell in the network uses the same set of frequencies simultaneously for the transmission of information. However, in wireless systems it is challenging to achieve a frequency reuse of one because of the co-channel interference presented by the sources of adjacent cells. Thus, separate communication techniques may be used in the transmission of information in order to differentiate the information transmitted by the source in each cell.

One of the techniques used to reduce co-channel interference is orthogonal frequency-division multiplexing (OFDM). OFDM is a digital multi-carrier modulation scheme which uses a large number of closely-spaced subcarriers comprised of an orthogonal set of data symbols to transmit information. These subcarriers typically overlap in frequency, but are separated using algorithms such as a Fast Fourier Transform. Each subcarrier is typically modulated with a conventional modulation scheme, such as quadrature amplitude modulation or amplitude and phase-shift keying, in order to maintain a data rate similar to a single-carrier modulation scheme.

Traditional OFDM requires estimating the channel to determine co-channel interference between sources. However, in order to determine the interference between sources, one must know the parameters of the channel used for transmission. This requisite knowledge presents a problem for cellular communication systems—achieving a frequency reuse of one results in co-channel interference that makes it harder to estimate the parameters of the channel, while using a multi-carrier modulation scheme such as OFDM to eliminate the co-channel interference requires knowing the parameters of the channel.

SUMMARY OF THE DISCLOSURE

Accordingly, systems and methods are disclosed for transmitting information between sources and receivers to maximize throughput while minimizing co-channel interference. These systems and methods enable wireless communication to occur more reliably without having to waste the precious resource of throughput in a network.

The disclosed embodiments can be employed in any suitable wireless communications system, such as a cellular system (e.g., a mobile network) or a wireless Internet system (e.g., a WiMAX network) that include a plurality of devices or systems. Using a cellular system as an example, the cellular system may include a plurality of sources, or base stations, that can each communicate with receivers, or mobile stations (e.g., cellular telephones), that are within an area assigned to that base station. When a mobile station is connected to the cellular network, however, the mobile station may receive radio signals from not only an intended source (e.g., the base station assigned to cover the area that the mobile station is located in), but from one or more interfering sources (e.g., adjacent or neighboring base stations transmitting data to other mobile stations). Thus, the mobile station may be configured to decode a received signal in a manner that takes into account not only characteristics of the intended source, but also any interfering sources.

The intended source and interfering sources may broadcast separate signals for both data and pilot sequences known as "data subcarriers" and "pilot subcarriers", respectively. A particular base station might not use one or more of the subcarrier frequencies available to transmit pilot patterns or data. These frequency bands may be referred to as "unused subcarriers". The data sequences may include information transmitted through the network, while the pilot sequences may include channel information for a particular area of transmission. The pilot and data subcarriers may be broadcast over distinct bands of frequency. In order to maintain a frequency reuse of one for the data subcarriers while avoiding co-channel interference, the pilot subcarriers and the data subcarriers may be broadcast with different factors of frequency reuse. For example, the frequency reuse of the data subcarriers may be one while the frequency reuse of the pilot subcarriers may be a fractional number. This transmission scheme compromises true universal frequency reuse, but allows for the design of the pilot subcarriers to allow for better estimation of the channel.

The intended source and interfering sources may broadcast the pilot subcarriers with a particular design to minimize the effects of co-channel interference. This design may include distributing pilot subcarriers among multiple base stations. The pilot subcarriers may be distributed in frequency, in time, or both. This design may also include sharing pilot subcarriers across multiple base stations. The pilot subcarriers may include orthogonal sequences. In addition, the pilot subcarriers may include pseudonoise code sequences. The pseudonoise code sequences may be used as the symbols for the pilot subcarriers, or the pseudonoise code sequences may be applied to each symbol of an existing pilot sequence.

A mobile station may receive a signal that corresponds to both an intended signal associated with the intended source and an interfering signal associated with interfering sources. The mobile station may detect the pilot subcarriers and data subcarriers in the received signal, and estimate channel information associated with the interfering sources. The channel information may allow the mobile station to determine which portion of the received signal corresponds to the interfering signal. The mobile station can make this determination by analyzing a pilot subcarrier received from an interfering source. From the pilot sequence of the pilot subcarrier, the mobile station may determine an interference channel gain (e.g., magnitude and phase of the gain) associated with the physical space between the mobile station and the interfering source. Alternatively, the mobile station may compute just magnitude information for the interference channel gain, such as an average magnitude square or an instantaneous magnitude square of the interference channel gain.

The mobile station may use the estimated channel information to recover the portion of the received signal that corresponds to the interfering signal. This recovery may be based on the design of the pilot subcarriers broadcast by the intended source and the at least one interfering source. The recovery may be based on the fact that the frequency reuse of the data subcarriers and the frequency reuse of the pilot subcarriers are different, that the pilot subcarries include orthogonal sequences, and/or that the pilot subcarriers include pseudonoise code sequences. For example, the frequency reuse of the data subcarriers may be 1/P and the frequency reuse of the pilot subcarriers may be 1/P*Q, wherein P and Q are integers greater than 1 and 1/P is greater than 1/P*Q.

The mobile device may be able to detect whether the pilot subcarriers are distributed in at least one of frequency, time, or both. In addition, the mobile device may be able to detect whether the pilot subcarriers are shared across devices. Each of these functions may be performed by appropriate signal processing and/or control circuitry of the mobile device. If the pilot subcarriers are shared across base stations and include orthogonal sequences, the receiver may use a forward Fast Fourier Transform to demodulate the signal and recover the originally transmitted information.

BRIEF DESCRIPTION OF THE FIGURES

The above and other aspects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
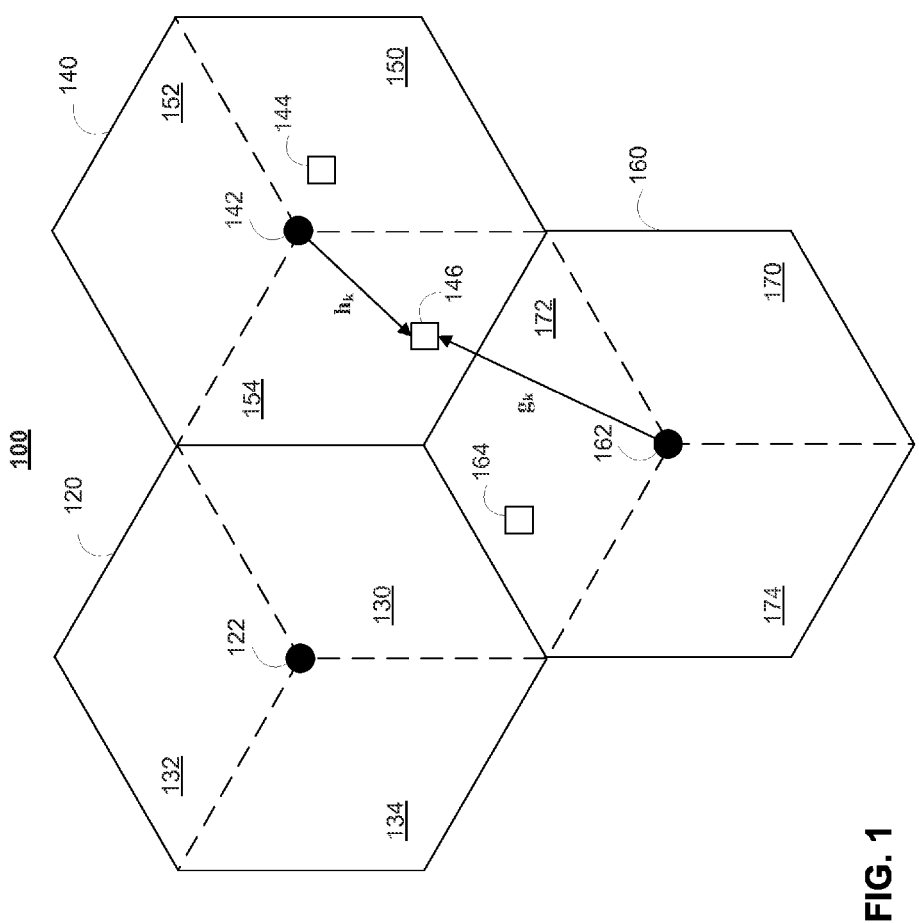
FIG. 1 is a diagram of three radio cells of an illustrative cellular system.

FIG. 1 shows a simplified diagram of illustrative cellular system 100. Cellular system 100 can include a plurality of base stations that are interconnected to form a mobile or cellular network. These base stations can include base stations 122, 142, and 162. Each of these base stations can be configured to communicate with mobile stations located within a particular physical area within that base station's radio communications range. The physical area may be referred to as a radio cell. In particular, base station 122 may communicate with mobile stations within radio cell 120, base station 142 may communicate with mobile stations within radio cell 140 (e.g., mobile stations 144 and 146), and base station 162 may communicate with mobile stations within radio cell 160 (e.g., mobile station 164). In FIG. 1, radio cells 120, 140, and 160 are represented by hexagonal regions, although this shape is merely illustrative.

Mobile stations 144, 146, and 164 may be any suitable type of cellular telephone compatible with the base stations of the mobile network. For example, mobile stations 144, 146, and 164 can operate based on a protocol or communications standard compatible with base stations 122, 142, and 162. The base stations and mobile stations of cellular system 100 can operate using any suitable conventional cellular protocol, such as the Global Systems for Mobile communications ("GSM") standard a code division multiple access ("COMA") based standard, an orthogonal, frequency-division multiple access ("OFOMA") based standard (such as WiMAX), or using a non-conventional protocol.

The base stations and mobile stations in cellular system 100 may use any of a variety of modulation and coding schemes to enable reliable communication. For example, base stations 122, 142, and 162 may operate with a modulation scheme based on orthogonal frequency division multiplexing ("OFDM"). Further examples of suitable modulation and coding schemes will be discussed in detail below in connection with FIGS. 2 and 3. To notify the mobile stations of the modulation and coding used by a base station, base stations 122, 142, and 162 may broadcast a control sequence to at least the mobile stations within their respective radio cells. This control sequence may be in the form of a pilot sequence, or pilot pattern. In addition to coding and modulation information, the control sequence may also include any other suitable control information that the mobile stations may use to interpret the data sent by a base station. For example, the control sequence may include information on how the data frames are structured, how many symbols are included in each frame, and the intended recipient (e.g., mobile station) of the next data block.

Base stations 122, 142, and 162 may transmit a pilot pattern or sequence to each mobile station within its radio cell to provide each mobile station with, among other things, phase alignment information. The pilot pattern may be based on a particular pseudo-noise ("PN") sequence, and each base station may utilize a different PN sequence. The different PN sequences may allow the mobile stations (e.g., mobile station 144) to identify the base station associated with a received pilot pattern.

Base stations 122, 142, and 162 may broadcast the pilot pattern or sequence and network data to all mobile stations that are within radio communication range. This allows each base station to not only transmit information to any mobile station within that base station's radio cell, but also to mobile stations in neighboring radio cells that are sufficiently close to the base station. For example, due to the proximity of mobile station 144 to base station 142 in radio cell 140, mobile station 144 may predominantly receive information from base station 142. Mobile station 146, on the other hand, may be able to receive information not only from base station 142 in radio cell 140, but may also receive interfering information from base station 162 in neighboring radio cell 160. The pilot pattern or sequence and the network data may be transmitted on a separate signal carried on the main transmission of base stations 122, 142, and 162. These separate transmissions may be referred to as subcarriers. Each subcarrier may be transmitted on a distinct frequency band, or they may be transmitted on overlapping frequency bands. If base stations 142 and 162 operate using subcarrier frequencies such that signals received from these two sources are not easily distinguishable, mobile station 146 may suffer from an effect referred to sometimes as "inter-cell co-channel interference" (or simply "co-channel interference" or "interference").

For simplicity, the radio signal expected by mobile station 146 (e.g., from base station 142, or the "intended source") may sometimes be referred to as the "intended signal," and the channel gain of the corresponding channel (e.g., the "intended channel") may sometimes be referred by the symbol, $h_k$. The radio signal from a neighboring mobile station (e.g., from base station 162, or the "interfering source") may sometimes be referred to as the "interference signal," and the channel gain of the corresponding channel (e.g., the "interference channel") may sometimes be represented by the symbol, $g_k$.

In many scenarios, the co-channel interference (e.g., the effect of base station 162 on mobile station 146) may be a stronger than any noise that may occur during data transmission from base station to mobile station. This may be especially true when a mobile station is near the boundary of two radio cells. In conventional communications protocols, co-channel interference is circumvented by having neighboring base stations broadcast network data using different frequency channels. For example, if cellular system 100 were to operate using one of these conventional protocols, the mobile network can assign a first frequency channel to base station 122 and radio cell 120, a second frequency channel to base station 142 and radio cell 140, and a third frequency channel to base station 162 and radio cell 160. By having neighboring base stations use different frequency channels, a mobile station in a particular radio cell can suffer from little to no interference from a base station in a neighboring radio cell. For example, in this scenario, even though mobile station 146 may be able to receive an interference signal from neighboring base station 162, mobile station 146 can tune into only the frequency channel of base station 142 to ensure that radio signals from base station 162 are substantially excluded.

In some embodiments, each radio cell of cellular system 100 may be further broken up into physical regions referred to sometimes as sectors, and current protocols can assign each of the sectors a different frequency channel. Radio cells may be decomposed into any suitable number of sectors (e.g., 2-10 sectors). For example, radio cell 120 may be decomposed into three sectors: sector 130, sector 132, and sector 134. Likewise, radio cell 140 may be decomposed into sector 150, sector 152, and sector 154 and radio cell 160 may be decomposed into sector 170, 174, and 176. In current protocols, each of these sectors may be assigned to a different or the same frequency channel by the mobile network. For example, the mobile network may assign each of the three sectors in radio cells 120, 110, and 160 to different frequency channels such that no neighboring sector uses the same frequency channel. As with the example above, where each radio cell is assigned to a different frequency, this scenario also allows the mobile stations to decode received signals without concern for interference effects.

The communications technique of assigning neighboring base stations or sectors different frequency bands may be referred to as frequency reuse. Cellular system 100 may, as described above, use three different frequency channels to implement frequency reuse. Such a communications system may be referred to as having a frequency reuse of ⅓.

While frequency reuse reduces interference, frequency reuse does not efficiently utilize the bandwidth made available to cellular systems. That is, cellular systems are assigned a limited amount of bandwidth. With each base station using only a fraction of the available bandwidth, each base station has a spectral efficiency (and therefore a maximum data rate) that is well below the possible spectral efficiency and data rate that can be achieved. Accordingly, as described in greater detail below, embodiments include techniques that enable greater frequency reuse. These techniques may be used with conventional communication protocols such as OFDM. Further, techniques are provided that can counter the effects of inter-cell co-channel interference such that using different frequency channels in neighboring radio cells or sectors is unnecessary.

While some embodiments of the present invention are described in terms of a cellular system, such as cellular system 100, this is merely illustrative. The techniques, features, and functionalities of the embodiments may be applied to other suitable communications systems, such as wifi and wireless Internet systems (e.g., WiMAX systems).

Figure 2:
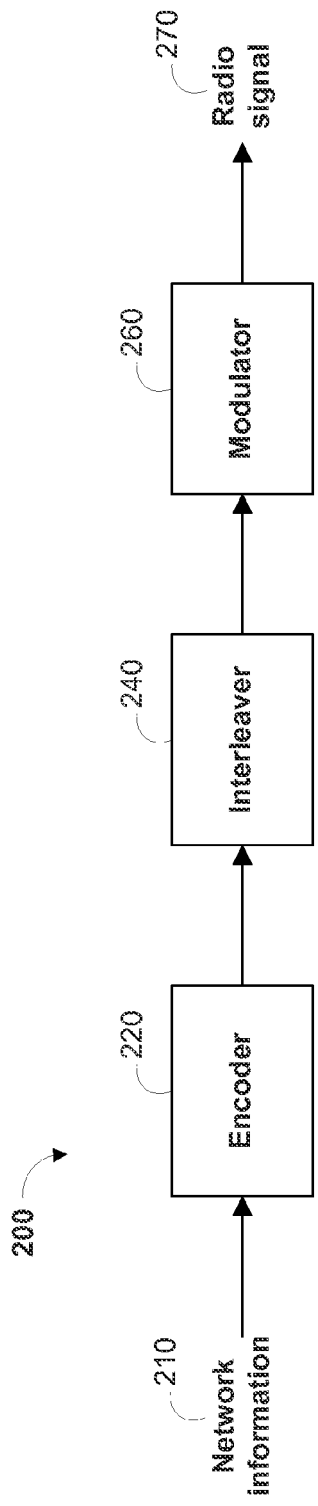
FIG. 2 is a block diagram of an illustrative base station transmitter.

FIG. 2 shows a simplified block diagram of base station transmitter 200 that can prepare network information 210 for transmission as radio signal 270, in some embodiments, base station transmitter 200 may be implemented as the transmitter for one or more of base stations 122, 142, and 162 of FIG. 1. Base station transmitter 200 can include encoder 220, interleaver 240, and modulator 260.

Encoder 220 may encode network information 210 based on a suitable error correcting code ("ECC"). For example, encoder 220 may operate using a convolutional code (e.g., a rate-½ or rate-⅔ convolutional code) of memory m. Encoder 220 may therefore convert network information 210, which may be some form of digital information (e.g., a stream of binary data), into an encoded stream of binary data. Since encoder 220 may have a memory of m, each m consecutive bits in the encoded stream created by encoder 220 depends on the value of the same one bit of network information 210. In order to remove any negative effects that may result from this dependency (e.g., the inability to reliably decode when burst errors are present), the encoded stream may be interleaved by interleaver 240. In particular, interleaver 240 may change the order of the bits in the encoded stream to ensure that neighboring bits in the interleaved sequence are effectively independent of each other.

Modulator 260 of base station transmitter 200 may be configured to convert, the interleaved digital sequence produced by interleaver 240 into a signal for transmission. Modulator 260 may first group bits of the interleaved sequence into symbols based on the size of a modulation scheme, and may then modulate the symbols into a signal having a particular magnitude and phase specified by the modulation scheme. Modulator 260 may use any suitable modulation scheme of any of a variety of sizes. For example, modulator 260 may utilize a quadrature amplitude modulation ("QAM") scheme (e.g., 4QAM, 16QAM, 32QAM) or a phase shift keying ("PSK") modulation scheme (e.g., QPSK, 16PSK, 32PSK).

The particular modulation scheme employed by modulator 260 may be designed to operate effectively with the particular error correcting code (ECC) employed by encoder 200. This type of communications technique is commonly referred to as coded modulation. Therefore, as base station transmitter 200 of FIG. 2 also includes interleaver 240, the overall communications technique employed by base station transmitter 200 can be referred to as bit-interleaved coded modulation ("BICM").

Modulator 260 may produce radio signal 270 for transmission to one or more mobile stations (e.g., mobile stations 144, 146, or 162). Radio signal 270 may sometimes be represented by the variable, x. At some time, k, radio signal 270 may represent a symbol of encoded/interleaved network information 210, and at some time, k+1, radio signal 270 may represent the next symbol of encoded/interleaved network information 210. For simplicity, the variable $x_k$ will be used below to represent the value of radio signal 270 when sampled at a particular time, k. In some embodiments k represents another type of dimension of radio signal 270 other than time, such as a spatial dimension or frequency dimension.

Radio signal 270 may be subject to noise (e.g., random noise or signal-dependent noise) during data transmission from base station transmitter 200 to a mobile station. In some scenarios, radio signal 270 may also be subject to co-channel interference that further distorts radio signal 270. Thus, even though radio signal 270 is transmitted, the radio signal actually received by a mobile station receiver may be considerably different from radio signal 270.

Figure 3:
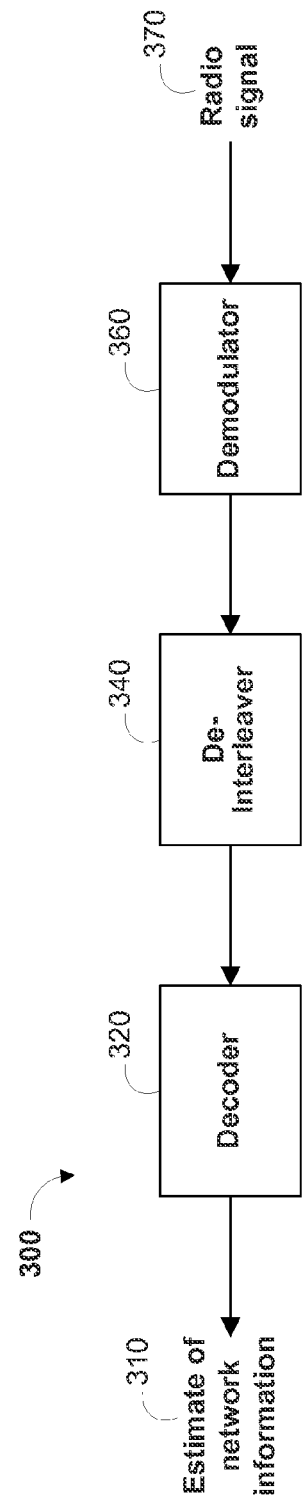
FIG. 3 is a block diagram of an illustrative mobile station receiver.

FIG. 3 shows a simplified block diagram of mobile station receiver 300. In some embodiments, mobile station receiver 300 may be implemented as part of one or more mobile stations 144, 146, and 164. Mobile station receiver 300 can be configured to receive and decode a noisy or distorted version of radio signal 270 (FIG. 2). In particular, mobile station receiver 300 may receive radio signal 370, which may be radio signal 270 after being affected by random or signal-dependent noise and inter-cell co-channel interference. Radio signal 370 may sometimes be represented by the variable, $y_k$ for some time, k. Mathematically, radio signal 370 may be given by, $$y_k = h_k x_k + v_k.$$ (EQ. 1)

In EQ. 1, $h_k$ is the channel gain that represents the magnitude and phase effect of the intended channel, and $v_k$ may represent both the noise and interference affecting radio signal 270.

Since $v_k$ in EQ. 1 may be a combination of noise and interference, EQ. 1 may be re-written as, $$y_k = h_k x_k + w_k + z_k,$$ (EQ. 2)

where $z_k$ constitutes the noise component of $v_k$, and $w_k$ constitutes the interference component of $v_k$. Finally, as the interference signal may be associated with an interference channel gain, $g_k$ (as described above in connection with FIG. 1), EQ. 2 may be rewritten as, $$y_k = h_k x_k + g_k s_k + z_k.$$ (EQ. 3)

Here, $s_k$ may be a radio signal that represents a symbol that the interfering base station intends to transmit to a different mobile station. Note that $s_k$ may be associated with a modulation scheme with a different number of signal constellation points, of differing magnitudes, and with a different symbol-to-signal point mapping.

Mobile station receiver 300 can be configured to decode radio signal 370 and obtain an estimate of the originally transmitted information (e.g., network information 210 of FIG. 2). To decode radio signal 370, mobile station receiver 300 can include demodulator 360, de-interleaver 340, and decoder 320. Each of these receiver components may correspond to a transmitter component in base station transmitter 200 and may effectively undo the operation performed by the corresponding transmitter component. For example, demodulator 360 may correspond to modulator 260 that can demodulate/de-map radio signal 370 using at least the modulation scheme and signal constellation set as modulator 260. De-interleaver 340 may correspond to interleaver 240 and may return the order of the received data into its original order, e.g., the order expected by decoder 320. Decoder 320 may be a soft-decoder that corresponds to encoder 220, and may perform decoding based on the same error correcting code (e.g., convolutional code) as encoder 220. Thus, decoder 320 may produce estimate 310 of network information (e.g., network information 210). If mobile station 300 successfully interprets radio signal 370, estimate 310 may be the same digital sequence as network information 210.

Mobile station receiver 300 of FIG. 3 can compute soft information for received signal 370 using accurate channel and modulation information for the interfering source. Using more than just the power of the noise and interference, demodulator 360 can compute a considerably more reliable and accurate log-likelihood ratio or other soft metric. To compute the channel information estimate, mobile station receiver 300 may, for example, include computational logic (not shown) that is configured to estimate the interference channel gain. The computational logic may also be configured to compute the intended channel gain. The computational logic may compute these channel information estimates by analyzing the characteristics of pilot patterns received from each source. This analysis may be based on the particular design of the pilot patterns broadcast by the base stations. In one example, if each source broadcasts a pilot pattern based on an orthogonal sequence, the computational logic can distinguish between the different pilot patterns. In another example, if each source broadcasts a pilot pattern based on a unique PN sequence, the computational logic can distinguish between the different pilot patterns. From the analysis of various pilot patterns, the computational logic produces an estimate of the interference and/or intended channel gain, for example. Mobile station receiver 300 may compute the channel information estimates at any suitable time during operation, such as at power-up, when initially connected to a base station, periodically, whenever the pilot sequence is transmitted, etc. The improved estimates of the soft information may allow decoder 320 to produce more accurate estimates of network information 310.

Referring now to FIGS. 4-7, various illustrative schemes for the broadcast of pilot subcarriers are shown. As mentioned above with respect to FIG. 3, a particular design for the pilot subcarriers broadcast by the base stations, such as the intended source and the interfering sources, in the cellular communication system can allow the mobile station receiver to distinguish between the different pilot patterns. This separation of the pilot patterns at the mobile station receiver allows for better estimation of the channel, which ultimately leads to a more accurate recovery of the portion of the received signal that corresponds to the intended signal. Each of these illustrative schemes shows broadcast subcarriers for three base stations. However, this number is merely illustrative, as each of the schemes shown in FIGS. 4-7 may be employed by any number of base stations, such as 5, 10, 50, 100, 500, 1000, 5000, or more than 5000 base stations. In addition, the number of subcarriers shown in FIGS. 4-7 is merely illustrative, as there may be any number of subcarriers broadcast by a base station, such as 5, 10, 50, 100, 500, 1000, 5000, or more than 5000 subcarriers. Further, each of the subcarriers of a particular base station in FIGS. 4-7 may be aligned in frequency with the subcarriers of another base station, or may be overlapping in frequency with the subcarriers of another base station.

Figure 4:
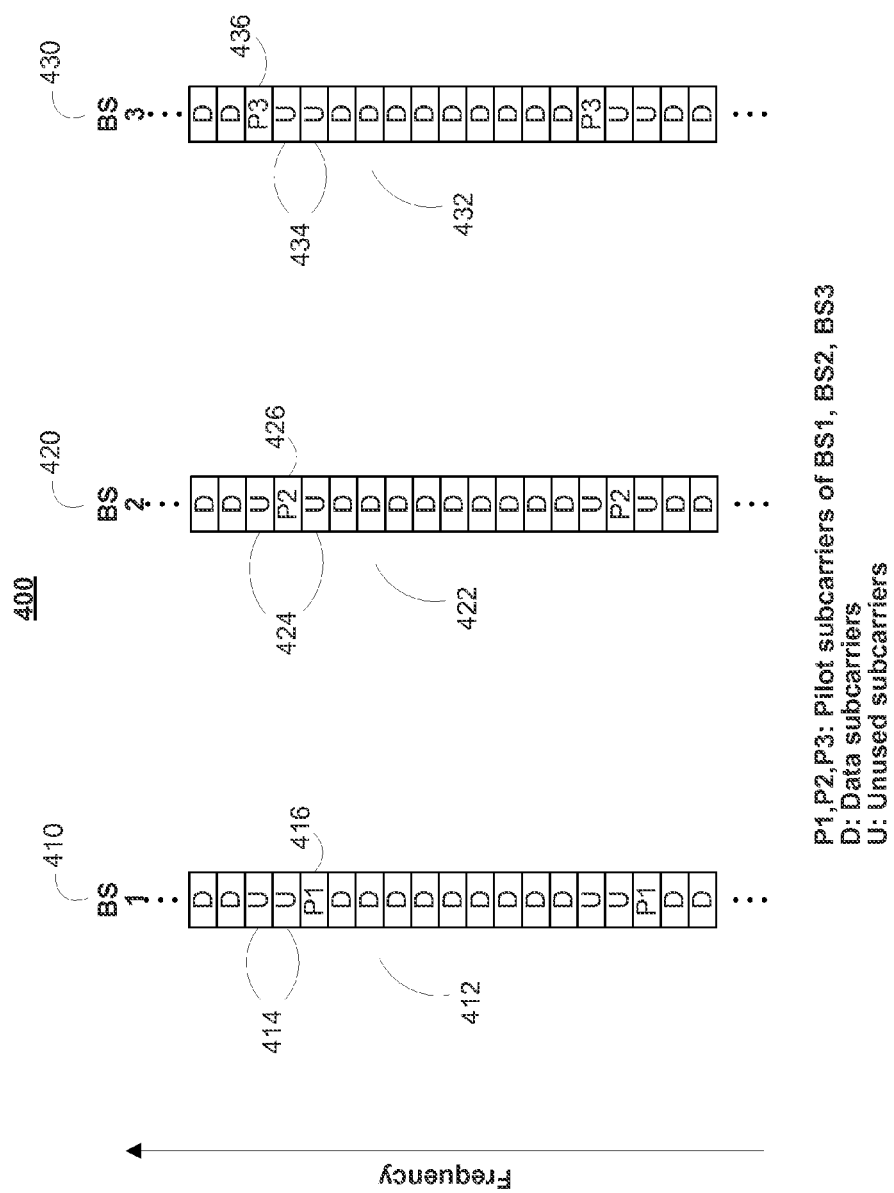
FIG. 4 is a diagram of an illustrative scheme for distributing pilot subcarriers over frequency.

Referring to FIG. 4, a diagram of an illustrative scheme 400 for distributing pilot subcarriers over frequency is shown. In scheme 400, a distinct pilot pattern or sequence is broadcast by each base station 410, 420, and 430 in a distinct set of pilot subcarriers 416, 426, and 436. Further, the pilot subcarriers are broadcast across each of the base stations 410, 420, and 430 with a frequency reuse factor that is different than the frequency reuse factor used to broadcast the data subcarriers 412, 422, and 432. As shown in scheme 400, the frequency reuse factor of the pilot subcarriers is fractional (in this case ⅓), while the frequency reuse factor of the data subcarriers is equal to one Thus, scheme 400 sacrifices universal frequency reuse to eliminate potential co-channel interference in the received signal at the receiver.

Further, in scheme 400 each pilot subcarrier for each base station is broadcast at a unique range of frequencies. Thus, scheme 400 can include unused subcarriers 414, 424, and 434, each of which correspond to a pilot subcarrier of another base station 410, 420, and 430. For example, base station 430 may not broadcast a data subcarrier or pilot subcarrier in the frequencies used by pilot subcarrier 416 of base station 410 and pilot subcarrier 426 of base station 420. Although scheme 400 shows unused subcarriers 414, 424, and 434 as being adjacent in frequency to pilot subcarriers 416, 426, and 436, unused subcarriers 414, 424, and 434 may be nonadjacent in frequency to pilot subcarriers 416, 426, and 436.

A mobile station receiver (e.g. mobile station receiver 300 of FIG. 3) can receive a signal with the superimposition of all of the subcarriers broadcast from base stations 410, 420, and 430. Thus, assuming that the subcarriers are aligned in frequency between each base station 410, 420, and 430, distinguishing between the pilot subcarriers may require no further design considerations in the broadcast of the pilot suhcarriers 416, 426, and 436. However, if the suhcarriers are not aligned in frequency, further design considerations may be needed in the broadcast of the pilot subcarriers. These design considerations will be discussed with respect to FIG. 7 below.

The pattern of unused subcarriers and pilot subcarriers may repeat at a particular band of frequencies among the subcarriers broadcast in each base station 410, 420, and 430. These repetitions of the pattern of unused subcarriers and pilot subcarriers may allow for greater redundancy of information about the pilot pattern or sequence at the mobile station receivers, and thus provide for fewer errors in the estimate of the network information provided by analysis of data subcarriers 412, 422, and 432.

Figure 5:
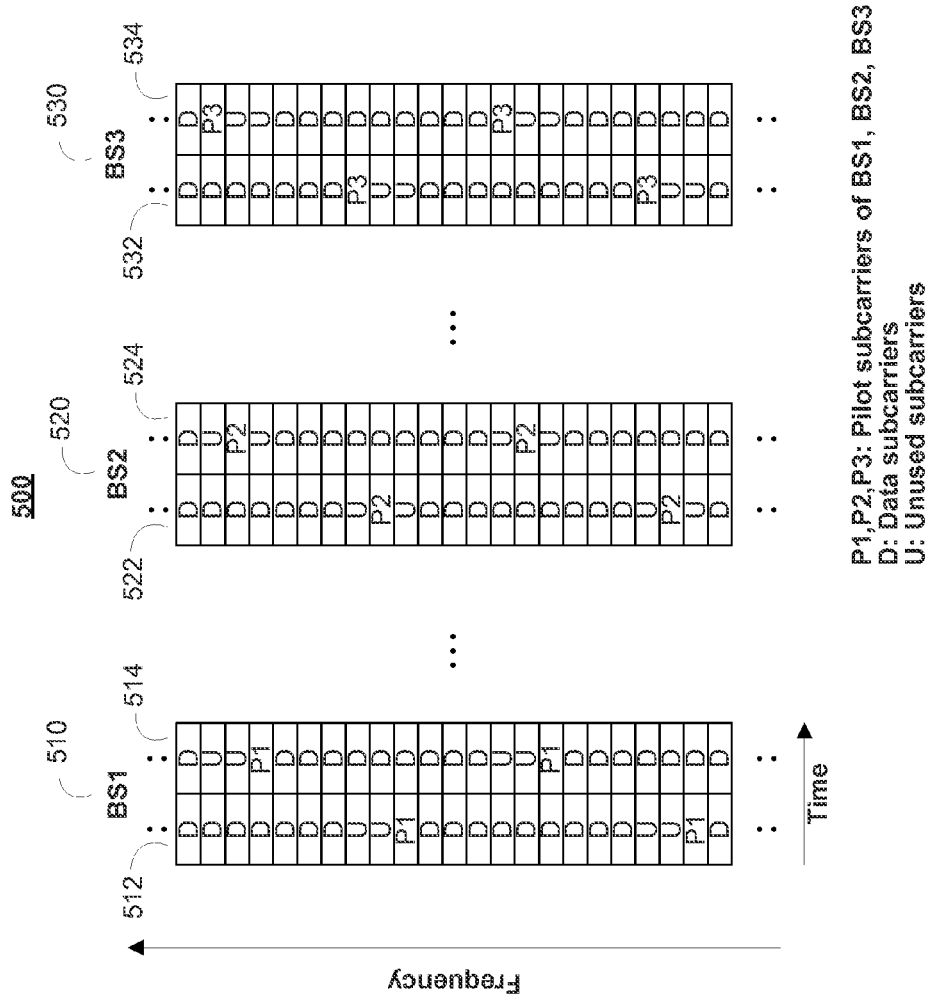
FIG. 5 is a diagram of an illustrative scheme for distributing pilot subcarriers over frequency and shifting the distribution over time.

Referring now to FIG. 5, a diagram of an illustrative scheme 500 for distributing pilot subcarriers over frequency and shifting the distribution over time is shown. In scheme 500, the pattern of data subcarriers, pilot subcarriers, and unused subcarriers 512, 522, and 532 may shift in frequency in each base station 510, 520, and 530 after a particular period of time, forming a new pattern of subcarriers 514, 524, and 534. The period of time could be any time period, such as one nanosecond, one microsecond, one millisecond, or greater than one millisecond. These shifts may be regular, meaning that they occur every time period, or they may occur according to any particular pattern in time. For example, a particular pattern of data subcarriers, pilot subcarriers, and unused subcarriers 512, 522, or 532 may shift in frequency every two time periods, followed by another shift in frequency after one time period. In addition, the shift in frequency may be the same during every shift, or may vary according to any particular pattern. Such a pattern in shifting can allow a mobile station receiver (e.g. mobile station receiver 300 in FIG. 3) to distinguish between pilot subcarriers more quickly and efficiently if certain frequencies are inundated with interference or are unusable for transmission due to environmental or network conditions.

In certain embodiments, the shifts in frequency will be coordinated between base stations 510, 520 and 530. That is, the shifts in frequency will occur such that the location of the pilot subcarrier in frequency will always be aligned in frequency with unused subcarriers across all base stations 510, 520, and 530. This coordination ensures that a mobile station receiver (e.g. mobile station receiver 300 in FIG. 3) will be able to distinguish between pilot subcarriers, barring any misalignment of the subcarriers in frequency.

Figure 6:
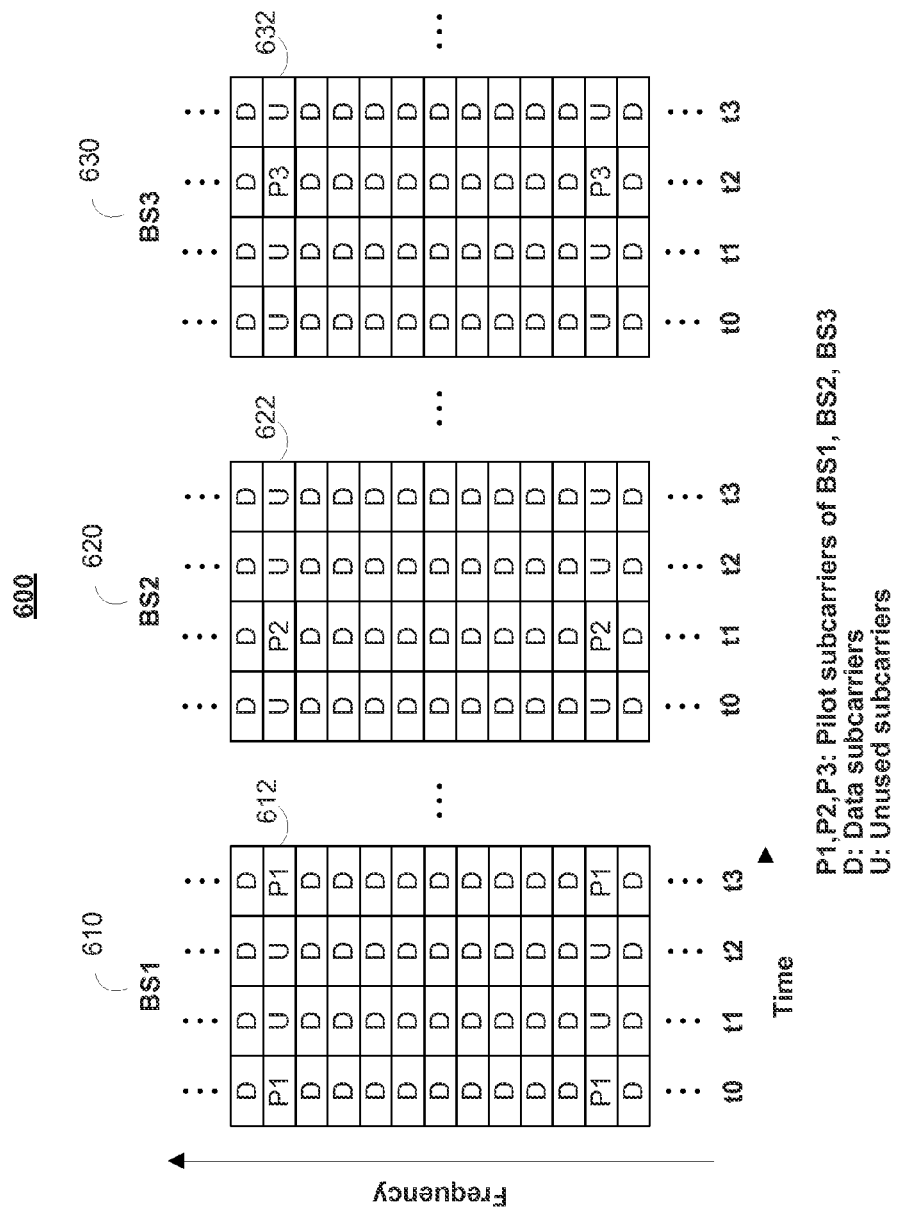
FIG. 6 is a diagram of an illustrative scheme for distributing pilot subcarriers over time.

Referring now to FIG. 6, a diagram of an illustrative scheme 600 for distributing pilot subcarriers over time is shown. In scheme 600, the pilot patterns broadcast by base stations 610, 620, and 630 are staggered in time by a particular time period as shown by patterns 612, 622, and 632. For example, base station 610 broadcasts pilot subcarrier P1 at time again at time t3, and then every two time periods thereafter; base station 620 broadcasts pilot subcarrier P2 at time t1, again at time t4, and every two time periods thereafter; and base station 630 broadcasts pilot subcarrier P3 at time t2, again at time t5, and every two time periods thereafter. In addition, each base station 610, 620, and 630 broadcasts their pilot subcarriers at the same set or frequencies. In this fashion, the broadcast of the pilot subcarriers takes up a minimal amount of bandwidth while allowing a mobile station receiver (e.g. mobile station receiver 300 in FIG. 3) to distinguish between received pilot subcarriers.

In certain embodiments, patterns 612, 622, and 632 may repeat at a particular band of frequencies among the subcarriers broadcast in each base station 610, 620, and 630. In addition, patterns 512, 622, and 632 may shift frequency simultaneously after a particular period of time similar to scheme 500 discussed with respect to FIG. 5.

By transmitting a particular pilot subcarrier sparsely in time, scheme 600 may only be useful in certain systems where a copy of the pilot pattern is not constantly needed for channel detection. However, scheme 600 has the advantage of providing the base stations with extra subcarriers for broadcasting data subcarriers, thus increasing the overall throughput of the system.

Figure 7:
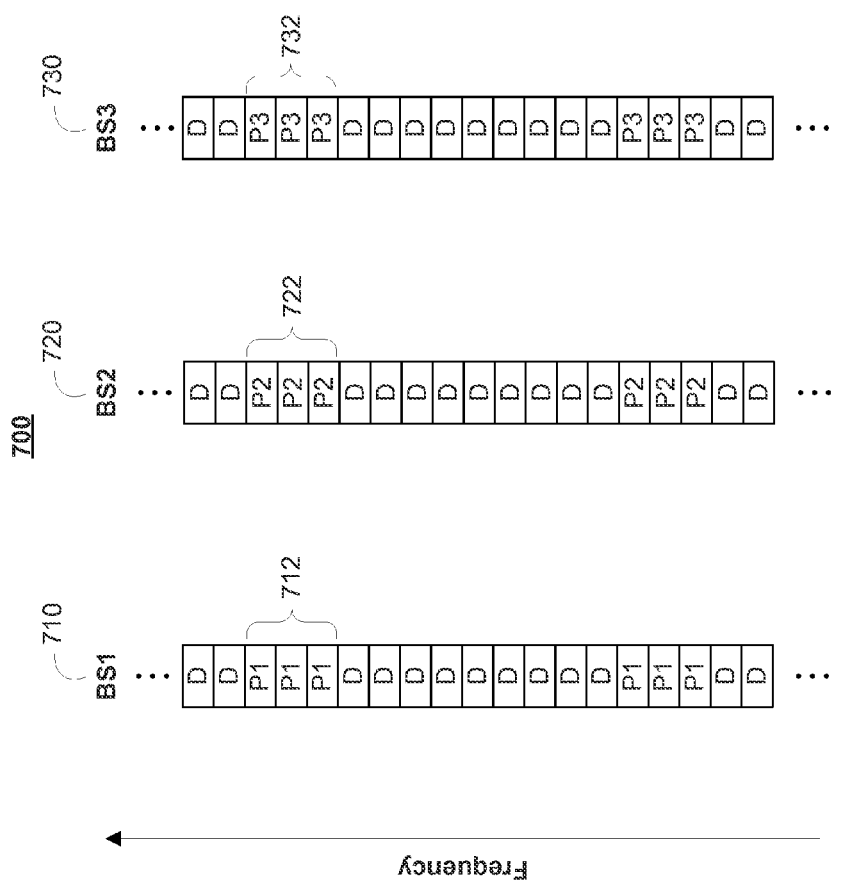
FIG. 7 is a diagram of an illustrative scheme for sharing pilot subcarriers across multiple base stations.

Referring now to FIG. 7, a diagram of an illustrative scheme 700 for sharing pilot subcarriers across multiple base stations is shown. In scheme 700, base stations 710, 720, and 730 broadcast pilot subcarriers 712, 722, and 732 at the same or overlapping set of frequencies. The individual pilot subcarriers P1, P2, and P3 may be broadcast any number of times depending on the desired redundancy for the data broadcast on the channel. For example, as shown in scheme 700 the pilot subcarriers P1, P2, and P3 are each broadcast three times. In addition, in scheme 700 it is preferable that pilot subcarriers 712, 722, and 732 are adjacent in frequency.

The design choice of sharing pilot subcarriers may be combined with any of the designs previously discussed—for example, schemes 500 and 600. For example, the pilot subcarriers 712, 722, and 732 may shift frequencies simultaneously after a particular period of time similar to scheme 500 discussed with respect to FIG. 5. In another example, pilot subcarriers 712, 722, and 732 may be staggered in time similar to scheme 600 discussed with respect to FIG. 6. In addition, pilot subcarriers 712, 722, and 732 may repeat at a particular band of frequencies among the subcarriers in each base station 710, 720, and 730.

A mobile station receiver (e.g. mobile station receiver 300 of FIG. 3) can receive a signal with the superimposition of all of the subcarriers broadcast from base stations 710, 720, and 730. Because the pilot subcarriers 712, 722, and 732 broadcast by base stations 710, 720, and 730 may overlap at least partially in frequency, the mobile station receiver may not be able to distinguish between the shared pilot subcarriers P1, P2, and P3 without using further techniques to design the shared pilot subcarriers.

In order for a mobile station receiver to distinguish between the shared pilot subcarriers, they can be designed to include orthogonal sequences. For example, in scheme 700 where there are three transmitting base stations in the network and assuming that the symbols are binary numbers, P1 could be the sequence [1 0 0], P2 could be the sequence [0 1 0], and P3 could be the sequence [0 0 1]. In another example, where there are three base stations in the network and assuming that the symbols are complex numbers, P1 could be the sequence [1 1 1], P2 could be the sequence [1 $e^{j2\pi/3}$ $e^{j4\pi/3}$], and P3 could be the sequence [1 $e^{j4\pi/3}$ $e^{j2\pi/3}$]. Further, orthogonal sequences for a network with N base stations, where N is any number, may be the columns of the Fourier matrix of size N by N. In addition, orthogonal sequences for a network with N base stations, where N is an even number, may be the columns of the Hadamard matrix of size N by N.

In order for channel estimation to be successful using shared pilot subcarriers designed to include orthogonal sequences, it is important that the characteristics of the channel remain constant over a period of time corresponding to the length of the orthogonal sequence. If the characteristics of the channel change over this period of time, it will be difficult for the mobile receiver to distinguish between the orthogonal sequences in the received pilot subcarriers.

Further, in order for a mobile station receiver to distinguish between shared pilot subcarriers, they can be designed to include a sequence of data symbols generated from a pseudoncise (PN) code. This design may be particularly useful to distinguish between broadcast pilot subcarriers when the number of base stations in the network is on the order of hundreds or thousands, or where there are large differences in the power of the transmission from the intended source as compared to the interfering sources. A PN code has a range of values similar to those of a random sequence of symbols, but the symbols are deterministically generated. Examples of PN codes may include maximal length sequences, Gold codes, Kasami codes, and Barker codes. A pseudonoise code may be applied to each symbol in the pilot subcarrier. For example, suppose that there are N base stations in the network, each of which broadcast a pilot sequence that is N symbols in length. Assuming the pilot sequence is binary, each bit of the pilot sequences can be multiplied by an N bit long pseudonoise sequence. The resulting bit sequence may then be used as the pilot sequence for the pilot subcarrier. The N symbol long pilot sequence may be an orthogonal sequence as mentioned above.

In addition, a PN code can be applied to any of the previously mentioned schemes that use a distinct pilot subcarrier set for each base station—for example, schemes 400, 500 and 600 discussed with respect to FIGS. 4, 5 and 6. In such schemes a unique PN sequence can be generated and used as the pilot sequence itself for each of the distinct pilot subcarriers.

Figure 8:
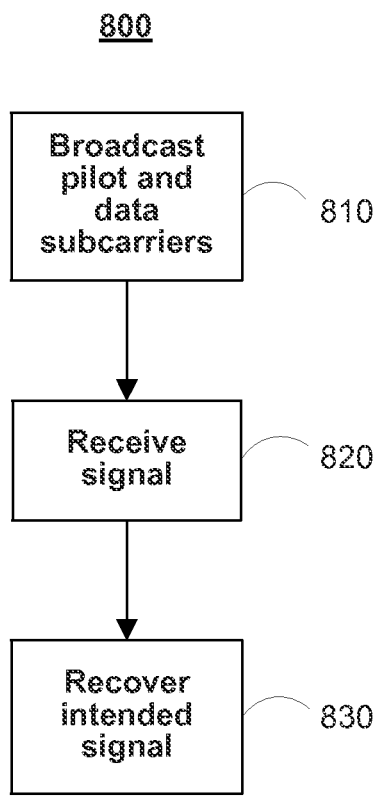
FIG. 8 shows a flow diagram of an illustrative process for transmitting information between an intended source and a receiver to minimize co-channel interference from interfering sources.

Referring now to FIG. 8, a flow diagram of an illustrative process 800 for transmitting information between an intended source and a receiver to minimize co-channel interference from at least one interfering source is shown. Process 800 begins at step 810. At step 810, pilot subcarriers and data subcarriers are broadcast from the intended source and interfering sources. The subcarriers may be broadcast in the form radio signal 270 (FIG. 2). The sources may be substantially similar to base station transmitter 200 (FIG. 2). The frequency reuse of the data subcarriers and the pilot subcarriers may differ according to any particular design, such as the designs discussed in schemes 400, 500, 600, and 700 with respect to FIGS. 4, 5, 6, and 7. For example, the frequency reuse of the data subcarriers may be different than the frequency use of the pilot subcarriers. More specifically, the frequency reuse of the pilot subcarriers may be fractional, while the frequency reuse of the data subcarriers may be one. This transmission scheme compromises true universal frequency reuse, but allows for the design of the pilot subcarriers to allow for better estimation of the channel. The pilot subcarriers may be designed according to any of schemes 400, 500, 600, and 700 with respect to FIGS. 4, 5, 6, and 7. The frequency reuse of the subcarriers as well as the design of the pilot subcarriers may be achieved by one or more of encoder 220, interleaver 240, and modulator 260 (FIG. 2).

After the pilot subcarriers and data subcarriers have been broadcast in step 810, process 800 moves to step 820. At step 820, a signal is received at the receiver. The receiver may be substantially similar to mobile station receiver 300 (FIG. 3) A portion of the signal can correspond to an intended signal associated with the intended source and an interfering signal associated with the interfering sources as described with respect to radio signal 370 (FIG. 3).

Once the signal has been received at step 820, the portion of the received signal that corresponds to the intended signal is recovered at step 830. This recovery may be achieved by decoder 320, de-interleaver 340, and demodulator 360 using one or more of the techniques discussed with respect to FIG. 3.

Referring now to FIGS. 9-15, various exemplary implementations of the present invention are shown.

Figure 9:
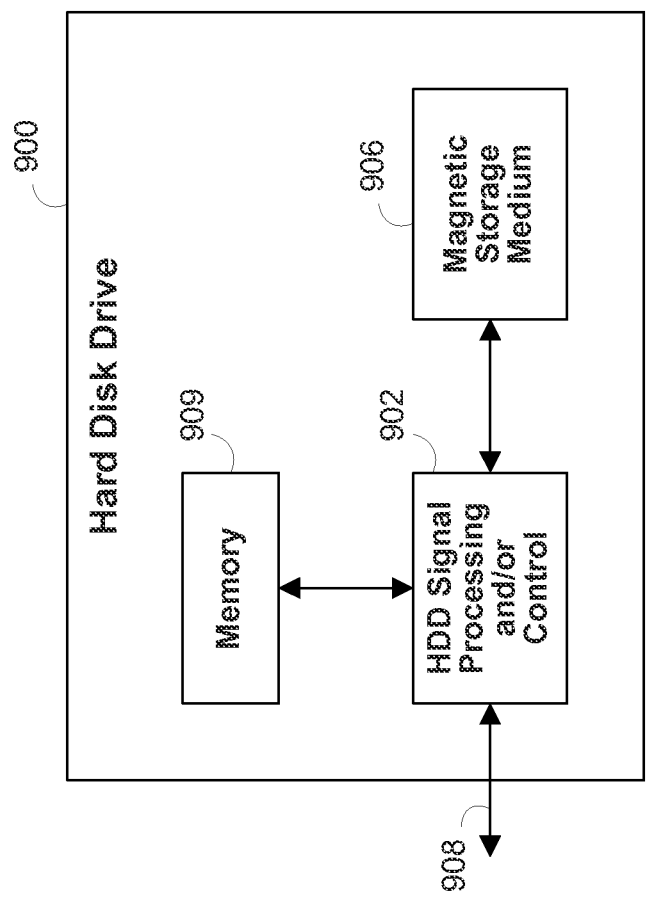
FIG. 9 is a block diagram of an exemplary hard disk drive that can employ the disclosed technology.

Referring now to FIG. 9, the present invention can be implemented in a hard disk drive (HDD) 900. The present invention may implement either or both signal processing and/or control circuits, which are generally identified in FIG. 9 at 902. In some implementations, the signal processing and/or control circuit 902 and/or other circuits (not shown) in the HDD 900 may process data, perform coding and/or encryption, perform calculations, and/or format data that is output to and/or received from a magnetic storage medium 906.

The HDD 900 may communicate with a host device (not shown) such as a computer, mobile computing devices such as personal digital assistants, cellular phones, media or MP3 players and the like, and/or other devices via one or more wired or wireless communication links 908. The HDD 900 may be connected to memory 909 such as random access memory (RAM), nonvolatile memory such as flash memory, read only memory (ROM) and/or other suitable electronic data storage.

Figure 10:
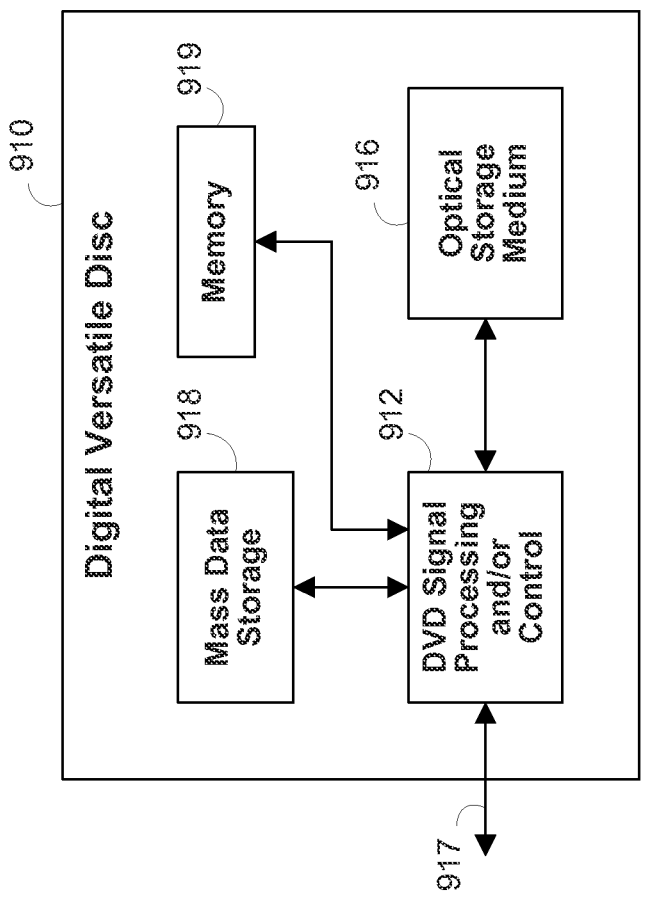
FIG. 10 is a block diagram of an exemplary digital versatile disc that can employ the disclosed technology.

Referring now to FIG. 10, the present invention can be implemented in a digital versatile disc (DVD) drive 910. The present invention may implement either or both signal processing and/or control circuits, which are generally identified in FIG. 10 at 912, and/or mass data storage 918 of the DVD drive 910. The signal processing and/or control circuit 912 and/or other circuits (not shown) in the DVD drive 910 may process data, perform coding and/or encryption, perform calculations, and/or format data that is read from and/or data written to an optical storage medium 916. In some implementations, the signal processing and/or control circuit 912 and/or other circuits (not shown) in the DVD drive 910 can also perform other functions such as encoding and/or decoding and/or any other signal processing functions associated with a DVD drive.

The DVD drive 910 may communicate with an output device (not shown) such as a computer, television or other device via one or more wired or wireless communication links 917. The DVD drive 910 may communicate with mass data storage 918 that stores data in a nonvolatile manner. The mass data storage 918 may include a hard disk drive (HDD). The HDD may have the configuration shown in FIG. 9. The HDD may be a mini HDD that includes one or more platters having a diameter that is smaller than approximately 1.8". The DVD drive 910 may be connected to memory 919 such as RAM, ROM, nonvolatile memory such as flash memory and/or other suitable electronic data storage.

Figure 11:
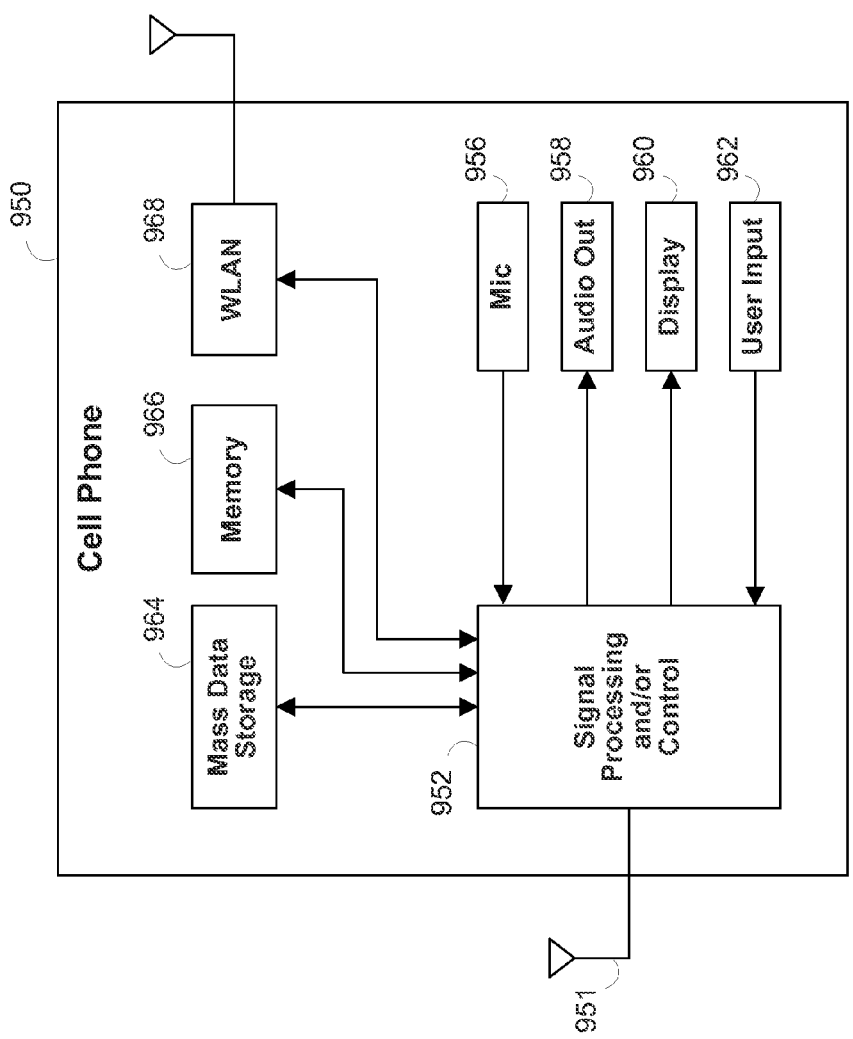
FIG. 11 is a block diagram of an exemplary phone that can employ the disclosed technology.

Referring now to FIG. 11, the present invention can be implemented in a cellular phone 950 that may include a cellular antenna 951. The present invention may implement either or both signal processing and/or control circuits, which are generally identified in FIG. 11 at 952, a WLAN network interface 968 and/or mass data storage 964 of the cellular phone 950. In some implementations, the cellular phone 950 includes a microphone 956, an audio output 958 such as a speaker and/or audio output jack, a display 960 and/or an input device 962 such as a keypad, pointing device, voice actuation and/or other input device. The signal processing and/or control circuits 952 and/or other circuits (not shown) in the cellular phone 950 may process data, perform coding and/or encryption, perform calculations, format data and/or perform other cellular phone functions.

The cellular phone 950 may communicate with mass data storage 964 that stores data in a nonvolatile manner such as optical and/or magnetic storage devices for example hard disk drives and/or DVDs. At least one HDD may have the configuration shown in FIG. 9 and/or at least one DVD may have the configuration shown in FIG. 10. The HDD may be a mini HDD that includes one or more platters having a diameter that is smaller than approximately 1.8". The cellular phone 950 may be connected to memory 966 such as RAM, ROM, nonvolatile memory such as flash memory and/or other suitable electronic data storage. The cellular phone 950 also may support connections with a WLAN via WLAN network interface 968.

Figure 12:
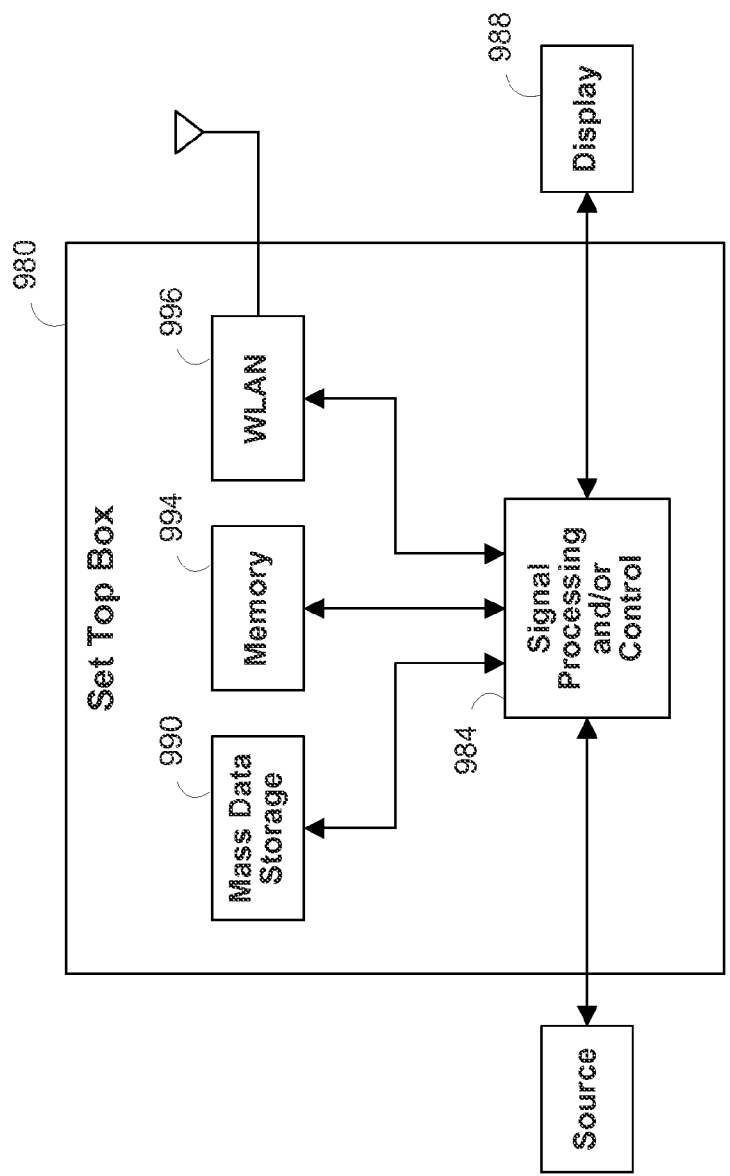
FIG. 12 is a block diagram of an exemplary set top box that can employ the disclosed technology.

Referring now to FIG. 12, the present invention can be implemented in a set top box 980. The present invention may implement either or both signal processing and/or control circuits, which are generally identified in FIG. 14 at 984, a WLAN network interface 996 and/or mass data storage 990 of the set top box 980. The set top box 980 receives signals from a source such as a broadband source and outputs standard and/or high definition audio/video signals suitable for a display 988 such as a television and/or monitor and/or other video and/or audio output devices. The signal processing and/or control circuits 984 and/or other circuits (not shown) of the set top box 980 may process data, perform coding and/or encryption, perform calculations, format data and/or perform any other set top box function.

The set top box 980 may communicate with mass data storage 990 that stores data in a nonvolatile manner. The mass data storage 990 may include optical and/or magnetic storage devices for example hard disk drives and/or DVDs. At least one HDD may have the configuration shown in FIG. 9 and/or at least one DVD may have the configuration shown in FIG. 10. The HDD may be a mini HDD that includes one or more platters having a diameter that is smaller than approximately 1.8". The set top box 980 may be connected to memory 994 such as RAM, ROM, nonvolatile memory such as flash memory and/or other suitable electronic data storage. The set top box 980 also may support connections with a WLAN via a WLAN network interface 996.

Figure 13:
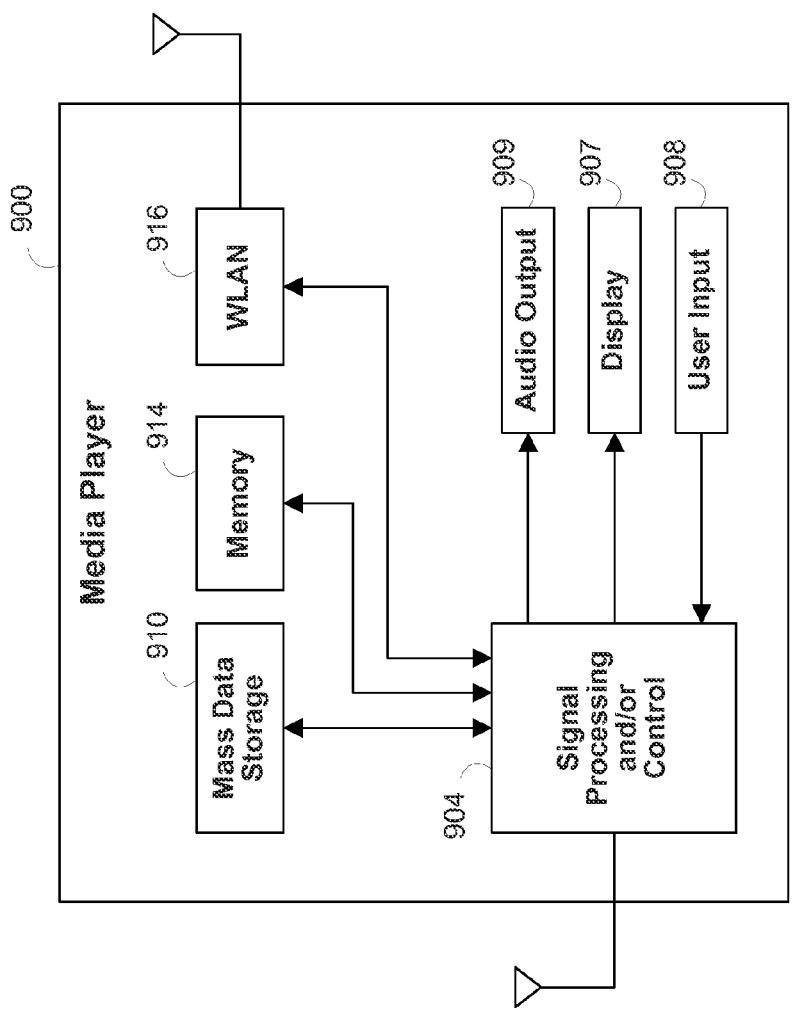
FIG. 13 is a block diagram of an exemplary media player that can employ the disclosed technology.

Referring now to FIG. 13, the present invention can be implemented in a media player 1000. The present invention may implement either or both signal processing and/or control circuits, which are generally identified in FIG. 15 at 1004, WLAN network interface 1016 and/or mass data storage 1010 of the media player 1000. In some implementations, the media player 1000 includes a display 1007 and/or a user input 1008 such as a keypad, touchpad and the like. In some implementations, the media player 1000 may employ a graphical user interface (GUI) that typically employs menus, drop down menus, icons and/or a point-and-click interface via the display 1007 and/or user input 1008. The media player 1000 further includes an audio output 1009 such as a speaker and/or audio output jack. The signal processing and/or control circuits 1004 and/or other circuits (not shown) of the media player 1000 may process data, perform coding and/or encryption, perform calculations, format data and/or perform any other media player function.

The media player 1000 may communicate with mass data storage 1010 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 9 and/or at least one DVD may have the configuration shown in FIG. 10. The HDD may be a mini HDD that includes one or more platters having a diameter that is smaller than approximately 1.8". The media player 1000 may be connected to memory 1014 such as RAM, ROM, nonvolatile memory such as flash memory and/or other suitable electronic data storage. The media player 1000 also may support connections with a WLAN via WLAN network interface 1016. Still other implementations in addition to those described above are contemplated.

The foregoing describes pilot design for universal frequency reuse in cellular orthogonal frequency-division multiplexing systems. Those skilled in the art will appreciate that the invention can be practiced by other than the described embodiments, which are presented for the purpose of illustration rather than of limitation.

What is claimed is:

1. A mobile device that recovers a first portion of a received signal associated with a first device, wherein the received signal comprises a second portion associated with a second device, the mobile device comprising:

detection circuitry that detects a first pilot transmission associated with the first device during a first period of time, and a second pilot transmission associated with the second device during a second period of time that is different from the first period of time, wherein the second pilot transmission occurs on at least one subcarrier that is unused by the first device during the second period of time;

an analyzer that determines a channel gain between the mobile device and the second device based on the second pilot transmission; and signal processing circuitry that recovers the first portion of the received signal based at least in part on the channel gain between the mobile device and the second device.

2. The mobile device of claim 1, wherein the detection circuitry detects the first pilot transmission and the second pilot transmission at a same frequency location.

3. The mobile device of claim 2, wherein the frequency location associated with the first pilot transmission and the second pilot transmission changes after a third period of time.

4. The mobile device of claim 1, wherein the first device transmits neither data nor pilot transmissions during the second period of time on the at least one subcarrier.

5. The mobile device of claim 1, wherein at least one of the first pilot transmission and the second pilot transmission comprises a plurality of orthogonal sequences.

6. The mobile device of claim 5, wherein the plurality of orthogonal sequences corresponds to the columns of one of a Fourier matrix or a Hadamard matrix.

7. The mobile device of claim 1, wherein at least one of the first pilot transmission and the second pilot transmission comprises a pseudonoise code sequence.

8. The mobile device of claim 1, wherein the first pilot transmission and the second pilot transmission overlap by at least one subcarrier.

9. The mobile device of claim 1, wherein the detection circuitry is configured to:
detect whether at least one of the first pilot transmission and the second pilot transmission is distributed over at least one of frequency and time.

10. The mobile device of claim 1, wherein the detection circuitry is configured to:
detect whether at least a portion of the first pilot transmission and the second pilot transmission is shared between the first device and the second device.

11. A method of recovering a first portion of a received signal associated with a first device, wherein the received signal comprises a second portion associated with a second device, the method comprising:
detecting a first pilot transmission associated with the first device during a first period of time and a second pilot transmission associated with the second device during a second period of time that is different from the first period of time, wherein the second pilot transmission occurs on at least one subcarrier that is unused by the first device during the second period of time;
analyzing the second pilot transmission to determine a channel gain between the mobile device and the second device; and
recovering the first portion of the received signal based at least in part on the channel gain between the mobile device and the second device.

12. The method of claim 11, wherein detecting the first pilot transmission and the second pilot transmission comprises detecting the first pilot transmission and the second pilot transmission at a same frequency location.

13. The method of claim 12, wherein the frequency location associated with the first pilot transmission and the second pilot transmission changes after a third period of time.

14. The method of claim 11, wherein the first device transmits neither data nor pilot transmissions during the second period of time on the at least one subcarrier.

15. The method of claim 11, wherein at least one of the first pilot transmission and the second pilot transmission comprises a plurality of orthogonal sequences.

16. The method of claim 15, wherein the plurality of orthogonal sequences corresponds to the columns of one of a Fourier matrix or a Hadamard matrix.

17. The method of claim 11, wherein at least one of the first pilot transmission and the second pilot transmission comprises a pseudonoise code sequence.

18. The method of claim 11, wherein the first pilot transmission and the second pilot transmission overlap by at least one subcarrier.

19. The method of claim 11, wherein detecting the first pilot transmission and the second pilot transmission comprises:
detecting whether at least one of the first pilot transmission and the second pilot transmission is distributed over at least one of frequency and time.

20. The method of claim 11, wherein detecting the first pilot transmission and the second pilot transmission comprises:
detecting whether at least a portion of the first pilot transmission and the second pilot transmission is shared between the first device and the second device.

* * * * *